United States Patent

Blixt et al.

[11] Patent Number: 5,857,776
[45] Date of Patent: Jan. 12, 1999

[54] METHOD AND DEVICE FOR MONITORING HANDLING CONDITIONS

[75] Inventors: Kjell Blixt, Malmö; Stig Jönsson, Arlöv, both of Sweden

[73] Assignee: Visual Indicator Tag Systems AB, Malmö, Sweden

[21] Appl. No.: 732,229

[22] PCT Filed: Apr. 5, 1995

[86] PCT No.: PCT/SE95/00363

§ 371 Date: Oct. 25, 1996

§ 102(e) Date: Oct. 25, 1996

[87] PCT Pub. No.: WO95/30136

PCT Pub. Date: Nov. 9, 1995

[30] Foreign Application Priority Data

Apr. 29, 1994 [SE] Sweden ................................. 9401464
Nov. 10, 1994 [SE] Sweden ................................. 9403859

[51] Int. Cl.⁶ .......................... G01K 11/12; G01K 11/06; G01K 13/10; G01K 1/16
[52] U.S. Cl. .......................... 374/106; 374/160; 374/162; 116/216; 116/217
[58] Field of Search .................................. 374/162, 106, 374/160; 116/216, 217

[56] References Cited

U.S. PATENT DOCUMENTS

| | | | |
|---|---|---|---|
| 2,379,459 | 7/1945 | Schreiber et al. | 374/162 |
| 2,460,215 | 1/1949 | Chase . | |
| 2,951,764 | 9/1960 | Chase . | |
| 3,260,112 | 7/1966 | Godbey et al. | 374/162 |
| 3,362,834 | 1/1968 | Kaye . | |
| 3,998,098 | 12/1976 | Chilton | 374/106 |
| 4,038,873 | 8/1977 | Kimmel | 374/106 |
| 4,043,871 | 8/1977 | Blixt et al. . | |
| 4,098,123 | 7/1978 | Granzow . | |
| 4,128,007 | 12/1978 | Ulin | 374/106 |
| 4,137,049 | 1/1979 | Couch et al. | 374/106 |
| 4,145,186 | 3/1979 | Andersen | 374/106 |
| 4,284,719 | 8/1981 | Agerhem et al. | 252/408.1 |
| 4,538,926 | 9/1985 | Chretien | 374/162 |
| 4,859,360 | 8/1989 | Suzuki et al. | 374/106 |

FOREIGN PATENT DOCUMENTS

| | | | |
|---|---|---|---|
| 0528462 | 9/1976 | U.S.S.R. | 374/162 |
| 1 283 342 | 7/1972 | United Kingdom . | |
| 1514809 | 6/1978 | United Kingdom | 374/162 |
| 1 557 742 | 12/1979 | United Kingdom . | |
| 2 244 132 | 11/1991 | United Kingdom . | |
| WO 93/03774 | 3/1993 | WIPO . | |

*Primary Examiner*—G. Bradley Bennett
*Attorney, Agent, or Firm*—Finnegan, Henderson, Farabow, Garrett & Dunner, L.L.P.

[57] ABSTRACT

A method and a device for monitoring the handling conditions of at least one object intended to be handled under certain predetermined conditions. The temperature or the temperature as a function of time of at least one object, is monitored to enable it to retain as much as possible of its original quality. To this end, a device is inserted into the object, or between two objects in a stack of objects, including a substantially flat, elongate casing, having a slot-shaped space between two opposed walls of the casing. An elongate slide-shaped body removably inserts into the slot-shaped space of the casting. At one end the slide-shaped body is provided with a technique for indicating, by color change, the exceeding and the falling-short of the predetermined conditions. The color change is thereafter observed visually by withdrawing the slide-shaped body removably inserted in the slot-shaped space of the casing. During the visual observation, the color may be suitably compared with a color scale on the slide-shaped body. Also, the casing of the device may be perforated at one end. Furthermore, at least the portion of the inside of the casing contacting the means when inserted in the casing, may be suitably provided with ridges extending in the longitudinal direction of the casing.

9 Claims, 1 Drawing Sheet

METHOD AND DEVICE FOR MONITORING HANDLING CONDITIONS

BACKGROUND OF THE INVENTION

1. Field of the Invention

The present invention relates to a method and a device for time and/or temperature determination, and more specifically to a method for monitoring the handling conditions of at least one object, such as an individual package or a stack of such packages containing refrigerated or frozen products, the object being intended to be handled under certain predetermined conditions, and to a device for carrying out the method.

2. Description of The Related Art

The term "handling" as used in the present context relates to storage, transport and similar treatment of an object, and the expressions "handling conditions" and "conditions" as used in the present context relate to either the temperature prevailing during the handling of the object, or the time and the temperature, i.e. the total or integrated influence of time and temperature on the object during the handling thereof.

There are a great many objects and products, such as foodstuffs, medicines, vaccines, blood products, photographical film etc, that are temperature-sensitive and should be stored or handled at a certain temperature in order to prevent quality degradation. Typical examples of such products are foodstuffs, such as refrigerated foods, e.g. milk, vegetables etc, or frozen foods, e.g. meat, fish, ice-cream etc. For example, in order that a deep-frozen product should have a satisfactory quality when reaching the shop, it should not be subjected to a temperature exceeding e.g. about −15° C. to −18° C., after departure from the producer and until the time of arrival in the shop. For refrigerated foods, the corresponding temperature is about +4°–8° C. On its way from the producer to the consumer, a frozen food passes through a large number of handling steps, such as storage with the producer, transportation from the producer to the wholesaler, storage with the wholesaler, transportation from the wholesaler to the retailer, and storage with the retailer. In all these partial steps, the deep-frozen food must be handled correctly, i.e. at a temperature which does not exceed about −15° C. to −18° C., in order to prevent its quality from degrading. To this end, the temperature of the product is checked at regular intervals in each partial step, i.e. during transport and storage.

One way of performing such checking is to insert a needle-equipped electronic thermometer into a stack of packages containing deep-frozen products, and to read the temperature on the thermometer. However, this involves several disadvantages. First, the electronic thermometer is expensive to manufacture and purchase, and requires for its operation batteries which must be replaced at regular intervals. Moreover, the thermometer must be calibrated for correct indication, and the thermometer needle must on each measuring occasion be held inserted in the stack of packages with frozen products for several minutes to enable the thermometer to adjust itself and display the correct temperature. As deep-frozen products, especially foods, are normally stacked on pallets and at least one check must be made on the products on each pallet, it is understood that the total time for checking e.g. the load on a long-distance truck or in a storeroom is quite considerable and thus involves substantial costs.

There is thus a need to make the observation quicker and less expensive, and preferably also to make possible subsequent observation of the handling of the product to ensure that this handling falls within the limits applying to the product concerned, in respect of its consumability. This is also important in view of the strict products liability currently incumbent upon manufacturers in most countries.

The present invention aims to achieve this and obviate the shortcomings inherent in the prior-art technique, by means of a device which is easy and inexpensive to manufacture and which constantly is at the temperature of the product concerned, to enable a quick temperature observation without any delay for temperature adjustment of the device.

If one wishes to perform a more complete observation of the handling conditions of a product, and thus of its quality, it is further possible according to the invention, instead of only checking the temperature, also to check both temperature and time, more specifically by making an integration of the temperature conditions to which the product is subjected over the time during which the handling of the product takes place.

SUMMARY OF THE INVENTION

According to the invention, there is provided a method for monitoring the handling conditions of at least one object, such as an individual package or a stack of such packages, the object being intended to be handled under certain predetermined conditions, the method being characterised by inserting into the object a device consisting of a substantially flat, elongate casing having a slot-shaped space between two opposed walls of the casing, and an elongate slide-shaped body, which is movable into and out of the slot-shaped space and which is provided at one end with a means containing at least one composition selected from temperature-sensitive compositions and time-temperature-sensitive compositions and indicating by colour change the exceeding and the falling-short of the predetermined conditions, and by removing for control purposes the slide-shaped body inserted in the slot-shaped space of the casing, from said slot-shaped space for visual observation of the colour of said means.

According to the invention, there is also provided a device for controlling the handling conditions of at least one object, such as an individual package or a stack of such packages, the object being intended to be handled under certain predetermined conditions, characterised in that it consists of a substantially flat, elongate casing having a slot-shaped space between two opposed walls of the casing, and an elongate slide-shaped body, which is movable into and out of the slot-shaped space and which is provided at one end with a means containing at least one composition selected from temperature-sensitive compositions and time-temperature-sensitive compositions and indicating by colour change the exceeding and the falling-short of the predetermined conditions.

Other features of the invention will appear from the following description and the claims.

To facilitate the understanding of the invention, it will be described hereinafter with reference to a preferred embodiment thereof which is illustrated in the accompanying drawings.

DESCRIPTION OF THE PREFERRED EMBODIMENTS

Figure 1:
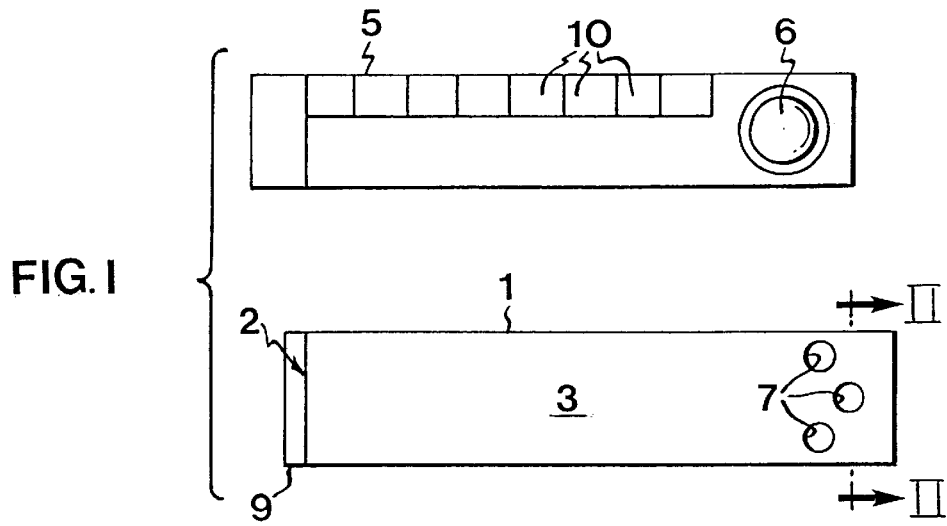
FIG. 1 is a top plan view of the casing and the slide-shaped body of the device according to the invention.
Figure 2:
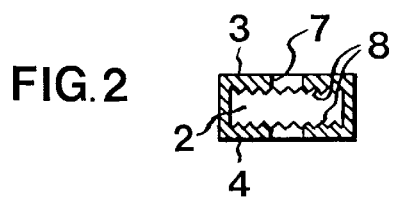
FIG. 2 is a cross-sectional view of the casing taken along line II—II in FIG. 1.
Figure 3:
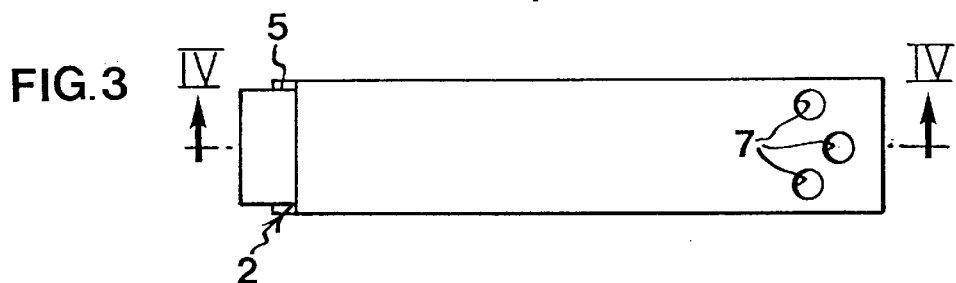
FIG. 3 is a plan view of the device in FIG. 1 with the parts assembled.

As appears from FIG. 1, and as previously mentioned, the device according to the invention consists of a substantially flat, elongate casing 1 having a slot-shaped space 2 between two opposed walls 3, 4 of the casing, and an elongate, slide-shaped body 5 which is movable into and out of the slot-shaped space 2 and which is provided at one end with a means 6 which indicates by colour change the exceeding and the falling-short of the predetermined conditions to be checked.

As also illustrated in FIGS. 1–4, the casing 1 is perforated (at 7) at one end, on a level with the means 6 when the slide-shaped body 5 is inserted in the casing 1.

The openings 7 formed by the perforation of the casing are intended to provide as quick a temperature equalisation as possible between the object whose temperature is to be checked, and the means 6. In the Figures of the drawing, the perforation is shown as three perforated openings, but it is understood that it may have any suitable design ensuring the desired, quick temperature equalisation between the object and the means 6.

According to one embodiment, the means 6 includes a reversibly temperature-sensitive composition, preferably in accordance with British Patent 1,557,742, which is hereby incorporated by reference. This temperature-sensitive composition is a water-based composition with controlled colour change and pH shift upon freezing or at a selected temperature below freezing point, the composition having a first component including an aqueous solution which contains a buffer and which upon a change of its temperature between a first temperature above its freezing point and a second temperature at or below its freezing point exhibits a pH shift, and the composition containing as additional components a regulator entailing a change of the proton conductivity of the frozen aqueous solution so as to affect the pH shift upon freezing, and at least one pH indicator exhibiting colour change upon pH shift. The regulator may be an alcohol, a carboxylic acid or a precursor thereof. Particular examples of alcohols are methanol, ethanol, glycols and glycerol. Particular examples of carboxylic acids are formic acid, acetic acid, succinic acid, citric acid and glutamic acid. Examples of precursors of alcohols or carboxylic acids are enzyme-substrate mixtures which by enzymatic reaction produce, respectively, alcohol and carboxylic acid, e.g. lipase-esterase-glyceryltricaproate.

According to another embodiment, the means 6 comprises an irreversibly time-temperature-sensitive composition for controlling the handling conditions in respect of the handling temperature as a function of the handling time. Such time-temperature-sensitive compositions are previously known and preferably designed as described in U.S. Pat. Nos. 4,043,871 and 4,284,719, which are hereby incorporated by reference. As stated in the latter patent, the means 6 may include such a time-temperature sensitive composition distributed in two small, closed plastic ampoules separated by a common, rupturable partition. One plastic ampoule contains an aqueous solution of enzyme and pH indicator, while the other plastic ampoule contains a substrate suspended in an aqueous medium. When the time-temperature indication is to commence, the rupturable partition is broken by the exertion of a compressive force on one of the plastic ampoules. In this way, the contents of the plastic ampoules will communicate with each other so that the contents of the ampoules are mixed and an enzymatic reaction is started. This enzymatic reaction proceeds with the production of a reaction product, such as caproic acid if the substrate is tricaproin and the enzyme is a lipase, depending on temperature and time. The pH indicator present is intended, by colouring, to indicate the excess of a certain amount of reaction product, such as acid.

The use of the preferred, temperature-sensitive composition according to GB 1,557,742 or the preferred time-temperature-sensitive composition according to U.S. Pat. No. 4,284,719 as the means 6 entails when checking, e.g. deep-frozen products, that the means freezes and its volume increases. In order that the means 6, upon such an increase of volume, should not get stuck in the slot-shaped space 2 between the walls 3 and 4, these walls are preferably provided, at least in the portion of the casing inside that is contacting the means 6 when this is inserted in the casing 1, with ridges 8 (see FIG. 2) extending in the longitudinal direction of the casing. This results in a small contact surface between the means and the inside of the casing (limited to the crests of the ridges), such that the slide-shaped body 5 can easily be inserted into and removed from the casing 1.

The casing and the slide-shaped body of the device according to the invention can be manufactured from several different materials, but for the device to function properly, it is preferred that certain special materials are selected. Thus, the device should be able, when inserted in a stack of objects, such as a stack of packages holding deep-frozen products, to withstand the compressive force exerted on the casing 1 by the stack, for which reason the casing should consist of a dimensionally-stable material. Furthermore, the casing should consist of a material having low thermal conductivity in order that heat should not unnecessarily be conducted from the surroundings to the location of the temperature-sensitive means 6. For these reasons, the casing material, and suitably also the material for the slide-shaped body 5, is selected from the group consisting of plastics, paper, paperboard and starch. Because of its high thermal conductivity, metal is however a less preferred material, despite it being dimensionally stable. The preferred materials paper, paperboard and starch also have the advantage of being environmentally-friendly.

Figure 4:
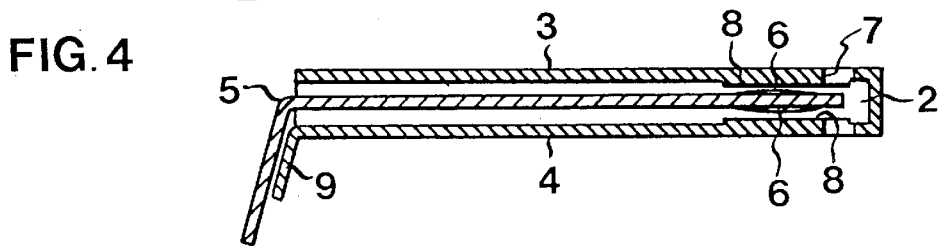
FIG. 4 is a longitudinal sectional view of the device taken along line IV—IV in FIG. 3.
Figure 5:
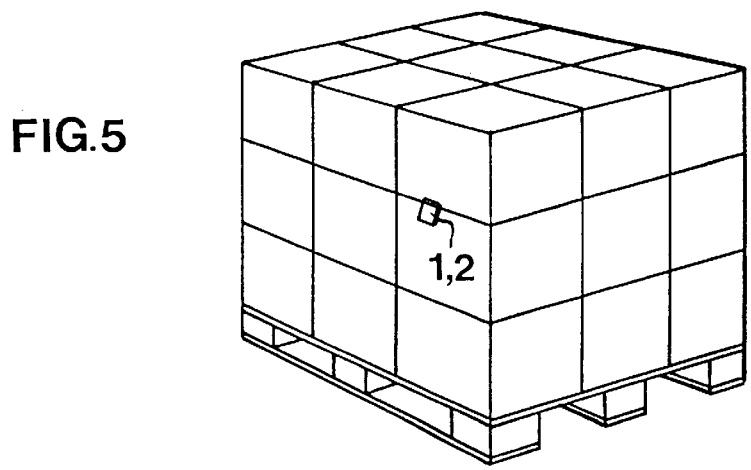
FIG. 5 is a perspective view of a loading pallet carrying a stack of packages and the device according to the invention inserted in the stack.

When inserting the device according to the invention into a stack of objects, as shown in FIG. 5, it is important that the device be not inserted so far that the slide-shaped body 5, for subsequent checking of the handling conditions, cannot be withdrawn from the slotted casing 1. For this reason, the casing is provided at one end (the outer end) with an abutment 9, which is downwardly bent from the longitudinal axis of the casing at right angles or almost right angles. The abutment 9 serves as a stop preventing the casing 1 from being inserted into a stack farther than the abutment 9. Similarly, it may be convenient also to design the outer end of the slide-shaped body 5 as a downwardly-bent abutment, as shown in FIG. 4, although this is not compulsory.

The device according to the invention is also usable for the monitoring of separate objects, such as a big pack (master package) of refrigerated or deep-frozen food. Instead of inserting the device between two objects, as done when checking a stack of objects, the device is now inserted into the object itself. The object should then suitably have been prepared in view of such an insertion of the device, e.g. by providing a centrally-positioned depression or opening in the object.

As previously mentioned, the exceeding or the falling-short of the predetermined handling conditions is indicated by a colour change of the temperature-sensitive means 6. If only a monitoring of the temperature prevailing at a certain point of time is to be made, the means 6 consists of a reversibly temperature-sensitive composition, preferably in accordance with the teachings of GB 1,557,742. If, on the other hand, the temperature is to be checked as a function of time, i.e. by an integration of temperature over time, the means 6 consists of an irreversibly time-temperature-sensitive composition, preferably in accordance with the teachings of U.S. Pat. No. 4,284,719. In order to arrange the composition on the slide-shaped body 5, the composition is placed in a container, such as capsule or ampoule, of a suitable material, such as plastics, which is attached to the body 5.

It is also possible to attach two or more containers to the slide-shaped body 5. These containers may hold different compositions of the above-mentioned type, i.e. different temperature-sensitive compositions and/or different time-temperature-sensitive compositions. Thus, the containers may hold mutually different time-temperature-sensitive compositions, which indicate by colour change when different amounts of the predetermined handling conditions, i.e. the estimated keeping-quality time, have been consumed. Suitably, use is made of two or more, preferably three mutually different compositions in separate containers. For example, it is possible to arrange three different time-temperature-sensitive enzymatic compositions in separate ampoules, the compositions being so prepared as to change colour when the product to be controlled is subjected to such time-temperature conditions that its estimated keeping-quality time has been consumed to a different degree. Thus, the composition in a first ampoule may be so prepared as to change colour when the product is subjected to such a combination of time and temperature that 10–30%, preferably about 25%, of its estimated keeping quality has been consumed, while the composition in a second ampoule may be so prepared as to change colour when 30–60%, preferably about 50%, of its keeping quality has been consumed, and finally the composition in a third ampoule may be so prepared as to change colour when 60–100%, preferably about 75%, of its keeping quality has been consumed. A device in which the means 6 thus comprises several different time-temperature-sensitive compositions can be designed in the manner shown in FIG. 1, with the exception that the means 6 consists, not of a single capsule or ampoule, but of several such capsules or ampoules, depending on how many different compositions are used. In this context, it should be added that it is not only possible to use several different time-temperature-sensitive compositions, but that the means 6 may similarly consist of several different temperature-sensitive compositions changing colour at different temperatures, or that the means 6 may consist of a combination of temperature-sensitive compositions and time-temperature-sensitive compositions. An especially preferred combination consists of three different time-temperature-sensitive compositions, as described above, combined with one temperature-sensitive composition. Thus, practically full information can be obtained about the handling conditions of a product, and a warning system can be provided which makes it possible, in the case of perishable products, to take measures before the products have been destroyed. Since such a system provides immediate information about the handling conditions of a product, it can be used for supplying products on the basis of the handling conditions to which they have been subjected, as opposed to the present systems, according to which the products first manufactured are first supplied (first in, first out), whether the products have been subjected to different handling conditions or not.

When the predetermined conditions should be monitored this is done by visual observation of the colour of the means 6. As previously mentioned, the means 6 indicates by colour change if the predetermined temperature has been exceeded or fallen short of, or if the predetermined time-temperature conditions have been exceeded or not. For example, the means 6 may have an orange colour at the predetermined temperature (e.g. about −18° C.), while the colour is bright yellow at lower temperatures, and violet at higher temperatures. To make it possible during the visual observation to quickly decide whether the conditions have been exceeded or not, it is suitable to compare the colour of the means with a colour gauge, i.e. a colour scale showing which colour corresponds to the predetermined temperature or temperatures above or below this temperature, or alternatively showing which colour corresponds to acceptable or unacceptable time-temperature conditions. It is preferred to arrange such a colour scale 10 on the slide-shaped body 5, as indicated in FIG. 1.

By the device according to the invention being of a simple design, as described above, and made of inexpensive materials, it can be manufactured at relatively low costs. Such low costs and the environmentally-friendly material from which the device is made entail that the device can be of disposable type, which means that it is not necessary to recycle the device once the temperature control of a certain stack of objects is completed.

Although the invention has been described above with reference to a preferred embodiment, it is understood that it is not restricted this particular embodiment, but may be modified within the scope of the appended claims. Thus, for example, the temperature-sensitive body need not be a circular ampoule 6, as intimated in the drawings, but may consist of an elongate column, arranged in the longitudinal direction of the slide-shaped body 5, of the temperature-sensitive composition described above. The temperature-sensitive means 6 may also consist of some other temperature-sensitive material, such as a temperature-sensitive dye or any other temperature-sensitive material changing colour upon a change of temperature.

We claim:

1. A method for monitoring the handling conditions of an object, the estimated keeping-quality time of which requires the object to be handled under certain predetermined conditions, the method comprising the steps of:

inserting into the object a device consisting of a substantially flat, elongate casing having a slot-shaped space between two opposed walls of the casing, and an elongate slide-shaped body inserted in said slot-shaped space, which is movable into and out of the slot-shaped space and which is provided at one end with means for indicating by colour change an exceeding and a falling-short of said predetermined conditions, said indicating means containing at least three compositions selected from (a) temperature-sensitive compositions with controlled colour change and pH shift upon freezing or at a selected temperature below freezing point, the temperature-sensitive composition having a first component including an aqueous solution which contains a buffer and which upon a change of temperature of the aqueous solution between a first temperature above its freezing point and a second temperature at or below its freezing point exhibits a pH shift, and the temperature-sensitive compositions further containing as additional components a regulator entailing a change of proton conductivity of the aqueous solution upon freezing so as to affect the pH shift upon freezing, and at least one pH indicator exhibiting colour change upon pH shift; and (b) time-temperature-sensitive enzymatic compositions containing an enzyme, an enzymatic substrate and a pH indicator, the enzymatic compositions having the ability to integrate the function of time and temperature to bring about a colour change;

said at least three compositions including:

a first time-temperature-sensitive enzymatic composition changing colour when 10–30% of the estimated keeping-quality time has been consumed;

a second time-temperature-sensitive enzymatic composition changing colour when 30–60% of the estimated keeping-quality time has been consumed;

a third time-temperature-sensitive enzymatic composition changing colour when 60–100% of the estimated keeping-quality time has been consumed; and removing for monitoring purposes the slide-shaped body inserted into the slot-shaped space of the casing, from said slot-shaped for visual observation of the colour of said indicating means.

2. The method as claimed in claim 1, characterized in that the colour of the indicating means is compared with a colour scale on the slide-shaped body during visual observation.

3. The method as recited in claim 1, wherein the substantially flat, elongate casing has an open end located adjacent to an exposed surface of the object and has a distal end located internal to the object, and wherein the step of removing the slide-shaped body includes maintaining the location of the distal end of the casing internal to the object.

4. The method as recited in claim 3, wherein the object includes a stack of packages and wherein the step of inserting includes locating the casing in a space defined by surfaces of at least two adjacent packages in said stack.

5. A device for monitoring the handling conditions of an object, the estimated keeping-quality time of which requires the object to be handled under certain predetermined conditions, the device comprising: a substantially flat, elongate casing having a slot-shaped space between two opposed walls of the casing, and an elongate slide-shaped body inserted in said slot-shaped space, which is movable into and out of the slot-shaped space and which is provided at one end with means for indicating by colour change an exceeding and a falling-short of said predetermined conditions, said indicating means containing at least three compositions selected from (a) temperature-sensitive compositions with controlled colour change and pH shift upon freezing or at a selected temperature below freezing point, the temperature-sensitive composition having a first component including an aqueous solution which contains a buffer and which upon a change of temperature of the aqueous solution between a first temperature above its freezing point and a second temperature at or below its freezing point exhibits a pH shift, and the temperature-sensitive compositions further containing as additional components a regulator entailing a change of proton conductivity of the aqueous solution upon freezing so as to affect the pH shift upon freezing, and at least one pH indicator exhibiting colour change upon pH shift; and (b) time-temperature-sensitive enzymatic compositions containing an enzyme, an enzymatic substrate and a pH indicator, the enzymatic compositions having the ability to integrate the function of time and temperature to bring about a colour change;

said at least three compositions including:

a first time-temperature-sensitive enzymatic composition changing colour when 10–30% of the estimated keeping-quality time has been consumed;

a second time-temperature-sensitive enzymatic composition changing colour when 30–60% of the estimated keeping-quality time has been consumed;

a third time-temperature-sensitive enzymatic composition changing colour when 60–100% of the estimated keeping-quality time has been consumed.

6. The device as claimed in claim 5, wherein the indicating means also comprises one temperature sensitive composition.

7. The device as claimed in claim 5, wherein the casing is perforated at one end, on a level with the indicating means when the slide-shaped body is inserted in the casing.

8. The device as claimed in claim 5, wherein at least a portion of an inside of the casing that is contacting the indicating means when inserted in the casing is provided with ridges extending in the longitudinal direction of the casing.

9. A device as claimed in any one of claims 5–8, characterised in that the casing consists of a dimensionally-stable material having low thermal conductivity.

\* \* \* \* \*

UNITED STATES PATENT AND TRADEMARK OFFICE
CERTIFICATE OF CORRECTION

PATENT NO. : 5,857,776
DATED      : January 12, 1999
INVENTOR(S): Blixt et al.

It is certified that error appears in the above-identified patent and that said Letters Patent is hereby corrected as shown below:

Abstract, title page, line 11, change "casting"

to --casing--.

Claim 1, Col. 7, line 27 after "slot-shaped" insert

--space--.

Signed and Sealed this

Twenty-ninth Day of June, 1999

Attest:

Q. TODD DICKINSON

*Attesting Officer*  *Acting Commissioner of Patents and Trademarks*